March 24, 1931.　　　B. B. HOLMES　　　1,798,125
ROLLER BEARING
Filed Feb. 12, 1927　　　2 Sheets-Sheet 1
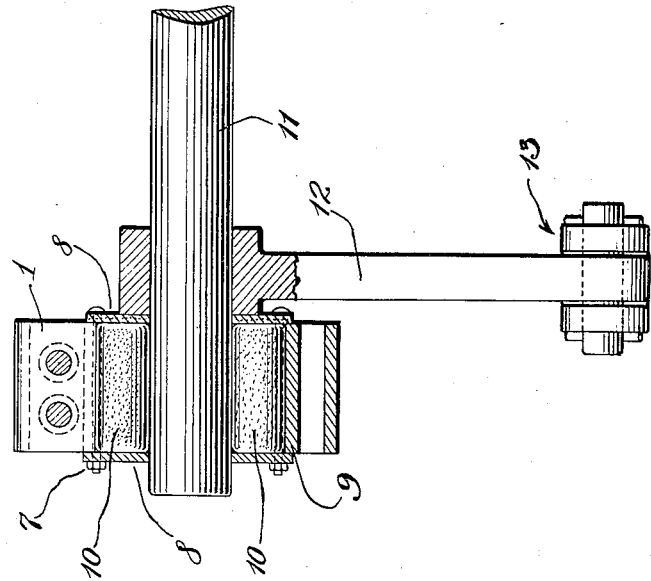
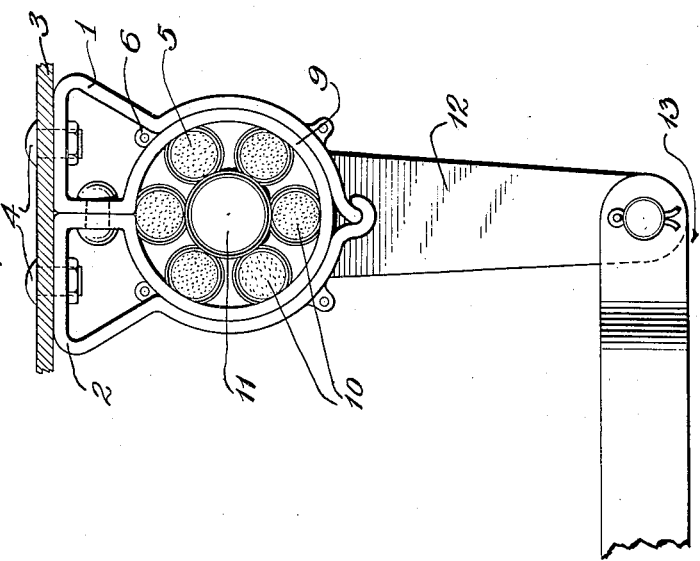
Inventor,
Bradford B. Holmes,
By his Attorney March 24, 1931.  B. B. HOLMES  1,798,125
ROLLER BEARING
Filed Feb. 12, 1927   2 Sheets-Sheet 2
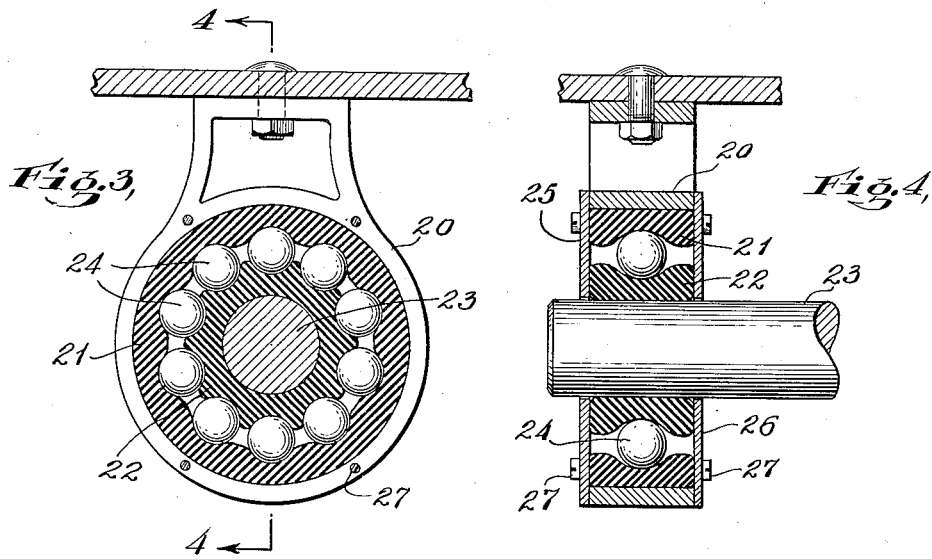
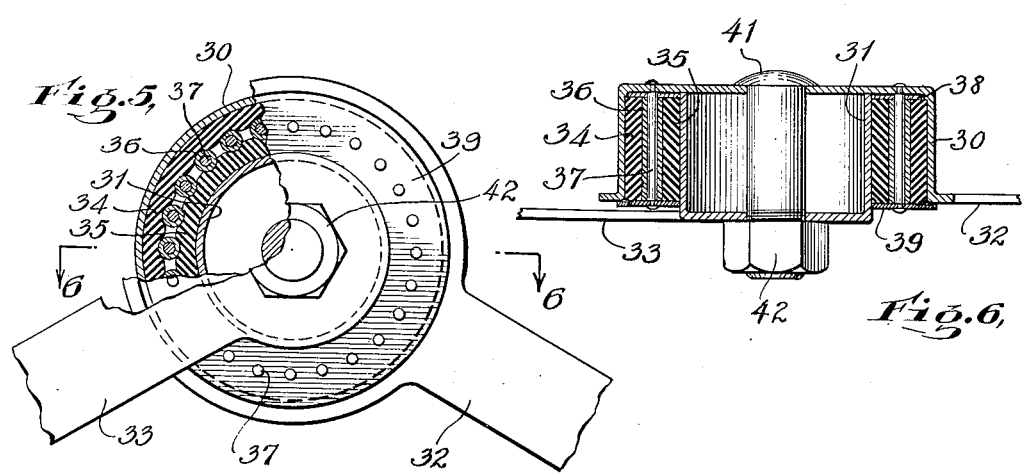
INVENTOR
*Bradford B. Holmes*
BY
ATTORNEY Patented Mar. 24, 1931

1,798,125

UNITED STATES PATENT OFFICE

BRADFORD B. HOLMES, OF NEW YORK, N. Y., ASSIGNOR TO AMERICAN CHAIN COMPANY, INC., A CORPORATION OF NEW YORK

ROLLER BEARING

Application filed February 12, 1927. Serial No. 167,612.

This invention relates to rolling bearings, and more particularly to the type of rotary rolling bearings having rollers or balls as bearing members.

The object of this invention is to provide a bearing having rollers or balls embraced closely between races of non-metallic resilient material. A further object is to provide a bearing having rollers or balls of a non-metallic resilient material embraced closely between a metal shaft and a metal race, or between two metal races.

The term rolling bearing as used in this application is to distinguish the bearings from sliding bearings, and denotes the fact that certain of the bearing surfaces are formed on rolling members. This type of bearing may be used in swivel joints and automobile rocker arm bearings in which friction is not objectionable.

A clear conception of the construction and further objects of this invention may be had from the following specification, in conjunction with the accompanying drawings, in which;

Fig. 1 is a view in elevation of a bearing of this type when used in conjunction with a brake rocker-arm.

Fig. 2 is a side view of Fig. 1 partly in cross-section.

Fig. 3 is a view in elevation with the cover removed of a bearing embodying the invention.

Fig. 4 is a view in longitudinal section on the line 2—2 of Fig. 3.

Fig. 5 is an elevation view partly in cross-section of the invention used in a swivel joint.

Fig. 6 is a cross-section through the line 6—6 of Fig. 5.

The preferred form of the invention shown in Figs. 1 and 2 is a type of rolling bearing which may be used advantageously on a brake rocker arm of an automobile. This particular part of an automobile seldom, if ever, receives any attention after the automobile is assembled, and therefore, it is desirable that it be an oilless and noiseless bearing. This bearing as shown in Figs. 1 and 2 comprises a piece of flat strip metal 1, bent in a shape as shown in Fig. 1, having a portion 2 suitable for connecting to the frame 3 as by bolts 4, and has a cylindrical portion 5 to receive the rolling bearing. Bosses 6 are provided to receive bolts 7 as a suitable means for holding the end plates 8 in place.

The rolling members 10 are of rubber or other resilient material and are forced into position between the cylindrial portion 9 of the bearing and a shaft 11, which is part of the brake mechanism. On the shaft is mounted, by any suitable means, an arm 12 to which may be connected a rod 13 for actuating the brake mechanism.

It is apparent that once this bearing is installed it will not need any further attention as it is oilless and noiseless and will also be free from vibrations or rattle as the rubber rollers constitute a noiseless bearing.

Figs. 3 and 4 show a modified form of the bearing using a resilient race of rubber and metal balls for the rolling surfaces. The casing 20 is similar to that described above and the races 21 and 22 are of rubber and are positioned against the shaft 23 and casing 20. The metal balls 24 are forced between the races and the covers 25 and 26 secured in place by bolts such as 27. This bearing constitutes an oilless and noiseless bearing of considerable merit.

A further modification of the rolling bearing as used in a swivel joint is shown in Figs. 5 and 6. The bearing consists of two cylinders 30 and 31 with arms 32 and 33 formed thereon. A pair of rubber races 34 and 35 are positioned between the cylinders 30 and 31 and a series of rollers such as 36, which rotates on a spindle 37, one end of which is fastened through the top of cylinder 30 and a washer 38 and the other end through a fiber washer 39. The rollers are forced into position between the races 34 and 35 and are free to rotate about their axes. The two (2) cylinders 30 and 31 are secured together by a bolt 41 and a nut 42, which form an axis about which the arms 32 and 33 may turn. This type of bearing is also oilless and noiseless and therefore, requires little, if any, attention.

It is further apparent that any of the forms of bearings described above may have one or more of its races vulcanized to the adjacent surfaces of the bearing or shaft without departing from the scope of the invention.

Claims:

1. In a rotary rolling bearing a plurality of race members and rollers in a cage closely embraced by said race members, said rollers being of metal and said race members being of non-metallic resilient material.

2. In a rotary rolling bearing a plurality of race members and rollers in a cage closely embraced by said race members, said rollers being of metal and said race members being of rubber.

3. In a rotary rolling bearing a plurality of race members and rolling members closely embraced by said race members, said rolling members being of metal, said race members being of rubber, and one of said races being vulcanized to the body of the bearing.

4. In a rotary rolling bearing mounted on a shaft, a plurality of race members and rollers in a cage closely embraced by said race members, said rollers being of metal and said race members being of rubber, and one of said race members being vulcanized to said shaft.

In testimony whereof, I have signed this specification.

BRADFORD B. HOLMES.